United States Patent
Butler

[15] 3,664,182
[45] May 23, 1972

[54] TENSION-TORSION TESTING MACHINE

[72] Inventor: Thomas W. Butler, 303 Balsam Drive, Severna Park, Md. 21146

[22] Filed: Feb. 25, 1971

[21] Appl. No.: 118,740

[52] U.S. Cl. ..................................................73/93
[51] Int. Cl. ...........................................G01n 3/08
[58] Field of Search ..........................73/95, 99, 93

[56] References Cited

UNITED STATES PATENTS 3,313,148  4/1967  Dautreppe et al. ...........................73/99
3,610,031  10/1971  Clark et al. ...............................73/99 X Primary Examiner—Jerry W. Myracle
Attorney—R. S. Sciascia and Q. E. Hodges

[57] ABSTRACT

The invention is a machine which simultaneously applies tensile and torsional loads to a material test specimen by the utilization of the untwisting of a spiral wound steel wire rope.

5 Claims, 3 Drawing Figures

PATENTED MAY 23 1972 3,664,182

INVENTOR.
THOMAS W. BUTLER
BY *J E Hodges*
ATTORNEY

TENSION-TORSION TESTING MACHINE

The invention described herein may be manufactured and used by or for the Government of the United States of America for Governmental purposes without the payment of any royalties thereon or therefor.

BACKGROUND OF THE INVENTION

There are currently a number of specially designed testing machines which can apply tensile load, torsional load and simultaneous tension and torsion to test specimens. These machines are expensive and delicate mainly because their designers desired the ability to have complete independence of tension and torsion load application.

The present invention has the advantage that it simultaneously applies tensile and torsional loads, where torsion load is proportional to tensile load, easily and inexpensively. The device is simple, rugged and gives repeatable results.

SUMMARY OF THE INVENTION

General purpose of this invention is to provide a machine which simultaneously applies tensile and torsional loads to material test specimens.

To attain this desired result, the present invention provides means to grip the specimen to be tested at one end of the specimen to prevent rotation about its longitudinal axis relative to said end fixture, and means to grip the other end of said test specimen coupled with a standard steel wire rope such that when the specimen is placed in tension, the steel wire rope will untwist thereby applying a torque to the specimen being loaded in tension.

OBJECTS OF THE INVENTION

It is a principal object of the instant invention to provide a machine which simultaneously applies tensile and torsional loads to a material test specimen.

It is a further object of the instant invention to provide apparatus whereby the various ratios between the torque and tension may be easily varied.

Still another object of the instant invention is to provide apparatus whereby tension alone may be applied to the test specimen followed by a superimposed torsion.

DESCRIPTION OF THE PREFERRED EMBODIMENT

Figure 1:
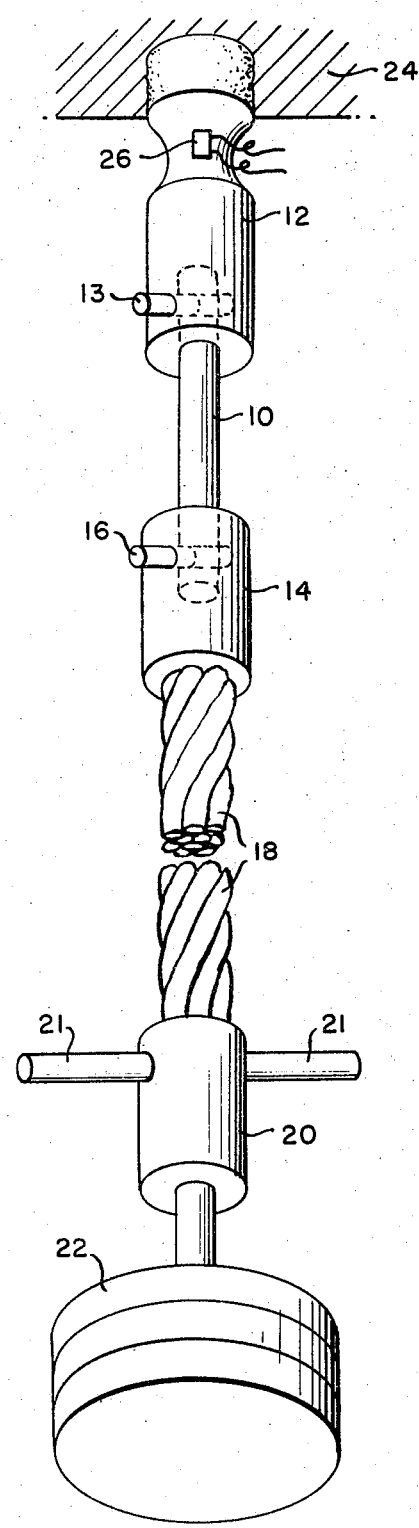
FIG. 1 shows the tension-torsion testing machine with a test sample in position.

With continued reference to the drawing, FIG. 1, shows the tension-torsion testing machine.

Figure 3:
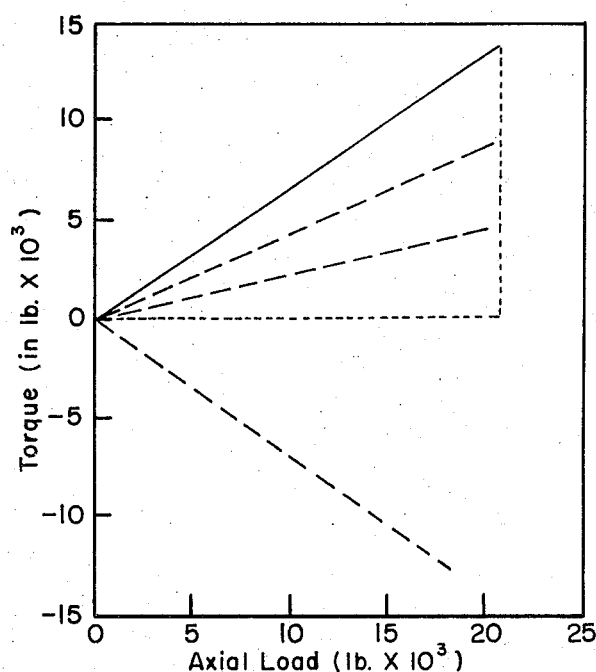
FIG. 3 shows typical results utilizing the tension-torsion testing machine.

The specimen to be tested 10, is threaded into end fixtures 12 and 14, and held in place against rotation about its longitudinal axis relative to the end fixtures by means of pins 13 and 16, which have been machined to fit snugly into holes in 10, 12 and 14. End fixture 12, is restrained against rotation at support 24, using conventional gripping techniques (not shown). End fixture 12, includes a reduced cross section portion which is gaged with resistance strain gage 26, in order to sense loads. Wire rope 18 is a standard (spiral-wound) steel wire rope with its ends embedded in end fixture 14, and terminal member 20. Terminal member 20, is restrained against rotation by support arms 21, about the longitudinal axis of the specimen 10, (and pieces 12, 14 and 18), and can only move axially along the longitudinal axis of the specimen 10. Said support arms 21 engage a conventional external frame (not shown). A tensile load 22, shown to be a set of weights, is applied to terminal member 20, which causes the tensile force to exist in pieces 10, 12, 14 and 18. A tensile load in the wire rope 18, causes the initially spiral wound wire rope elements to partially unwind. This straightening out or untwisting of the wire rope 18, induces a torsional load on the end fixtures 12 and 14 and on the specimen 10. Within certain limits, this torque is directly proportional to the axial load 22. The solid line of FIG. 3, shows the result of such a test.

Various ratios between torque and tension can be applied to the specimen 10, by utilizing interchangeable wire rope 18, of various dimensions and by varying the direction and length of lay of the spiral wound wire rope. The dashed lines of FIG. 3, shows the results of other possible ratios.

The torque and tensile load are measured by the previously calibrated load sensing portion 26, of end fixture 12. The longitudinal and torsional displacement of the specimen 10, are measured by standard strain analysis techniques.

Figure 2:
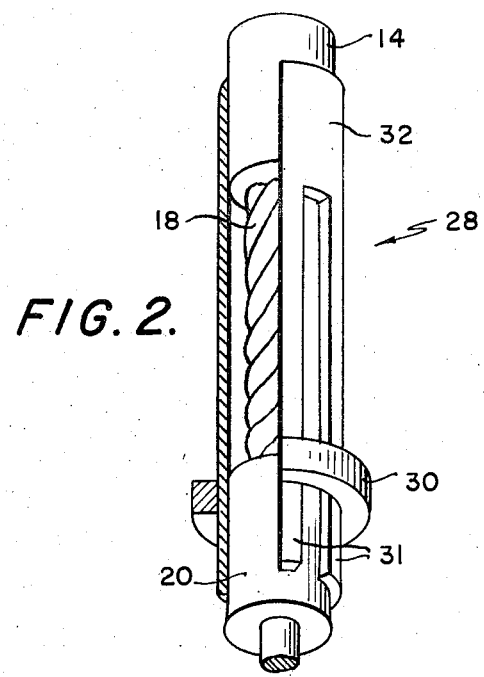
FIG. 2 shows a modification of the invention whereby tension alone followed by superimposed torsion could be applied to the specimen.

It is possible to have an intermediate member similar to terminal member 20, in FIG. 1, attached to end fixture 14 by means of a frictional clutch. FIG. 2 shows a typical modification of the preferred embodiment wherein the clutch 28 comprises a tapered sleeve 32, welded to end fixture 14, and having a plurality of fingers 31, which frictionally grip terminal member 20, when slip ring 30 is forced downward. Prior to the loading, the clutch 28 would be engaged. The load 22, when applied would tend to cause the wire rope 18 to untwist, however, due to the frictional clutch 28, in the intermediate member it could not untwist. Then, the clutch 28 could be loosened, allowing the cable to untwist and induce a torque as before. In this way, tension alone followed by superimposed torsion would be applied to the specimen. The dotted line of FIG. 3, shows this case. It is noted that FIG. 2 shows only one type of clutch and that any other well known clutch means could be employed within the scope of the invention.

It will be apparent from the foregoing that the invention provides apparatus of novel and advantageous construction whereby simultaneous tensile and torsional loads, where torsional load is proportional to tensile load, are easily and inexpensively applied to material test specimen. The device is simple, sturdy and gives repeatable results.

It is understood that the invention is not limited to exact details of the construction shown and described, for obvious modifications will occur to persons skilled in the art. For example, it would be possible to replace the spiral wound steel wire rope with a coil spring. It is therefore to be understood that within the scope of the appended claims the invention may be practiced otherwise than as specifically described.

What is claimed is:

1. A tension-torsion testing machine for testing a test specimen comprising:
    a first fixture means rigidly securing one end of said test specimen against linear and angular movement;
    a second fixture means connected to the other end of said specimen;
    converter means connected to said second fixture means for proportionately changing tensile force to torsional force and for transmitting said tensile and said torsional forces to said specimen; and
    a non-rotatable load means connected to said converter means to apply a tensile force, whereby both tensile and torsional forces are applied to said specimen.

2. A device as in claim 1 wherein said converter means comprises at least one spirally wound wire rope.

3. A device as in claim 2 wherein a strain sensing means is connected to said first fixture means in order to sense loads.

4. A device as in claim 3 wherein said first fixture means includes a reduced cross section portion and said strain sensing means is connected to said reduced cross section portion.

5. A device as in claim 2 which further includes a clutch means interconnected between said second fixture means and said load means to prevent relative rotation therebetween when engaged.

* * * * *